INVENTOR.
WILLIAM P. WARTHEN
BY
*Staelin & Overman*
ATTORNEYS

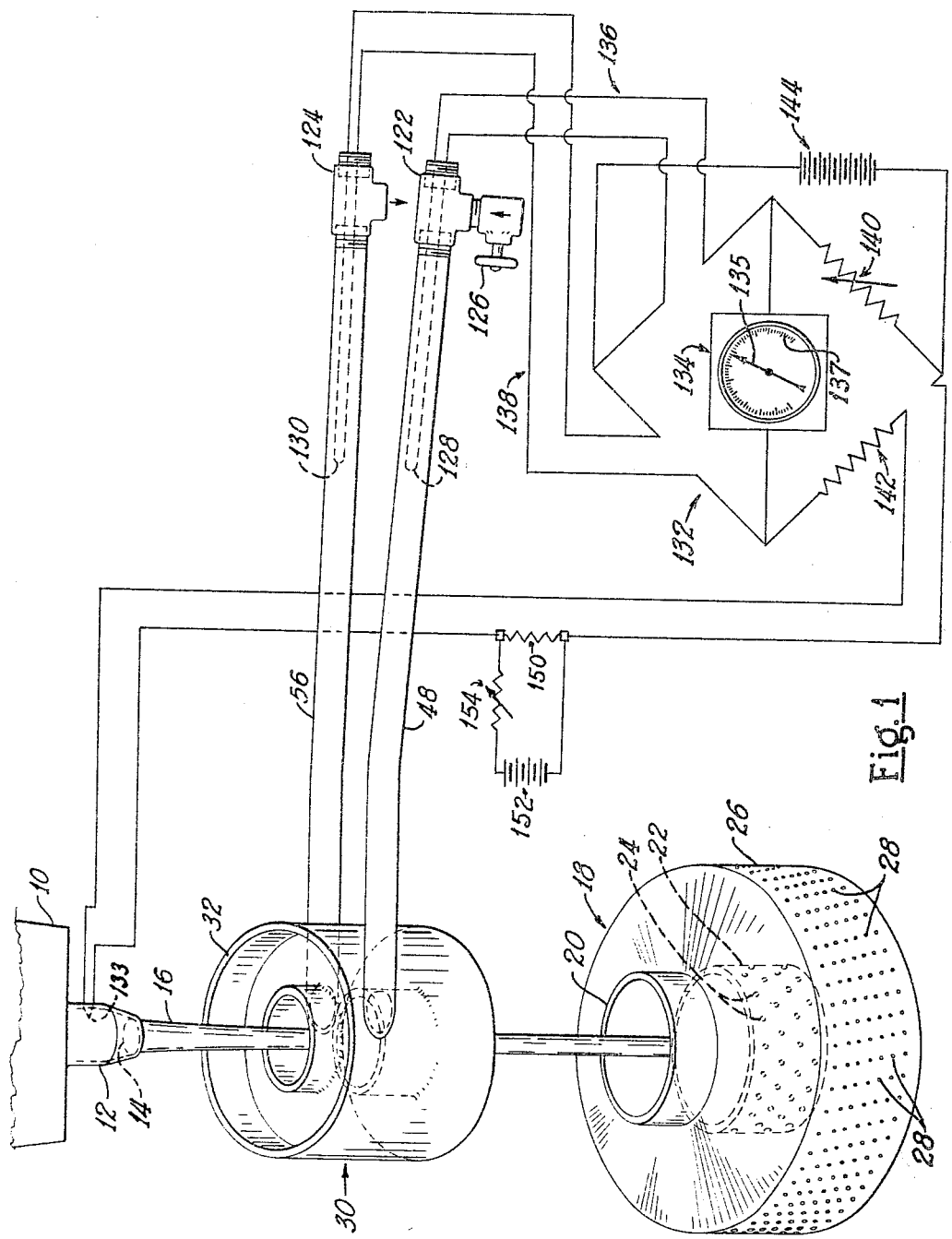

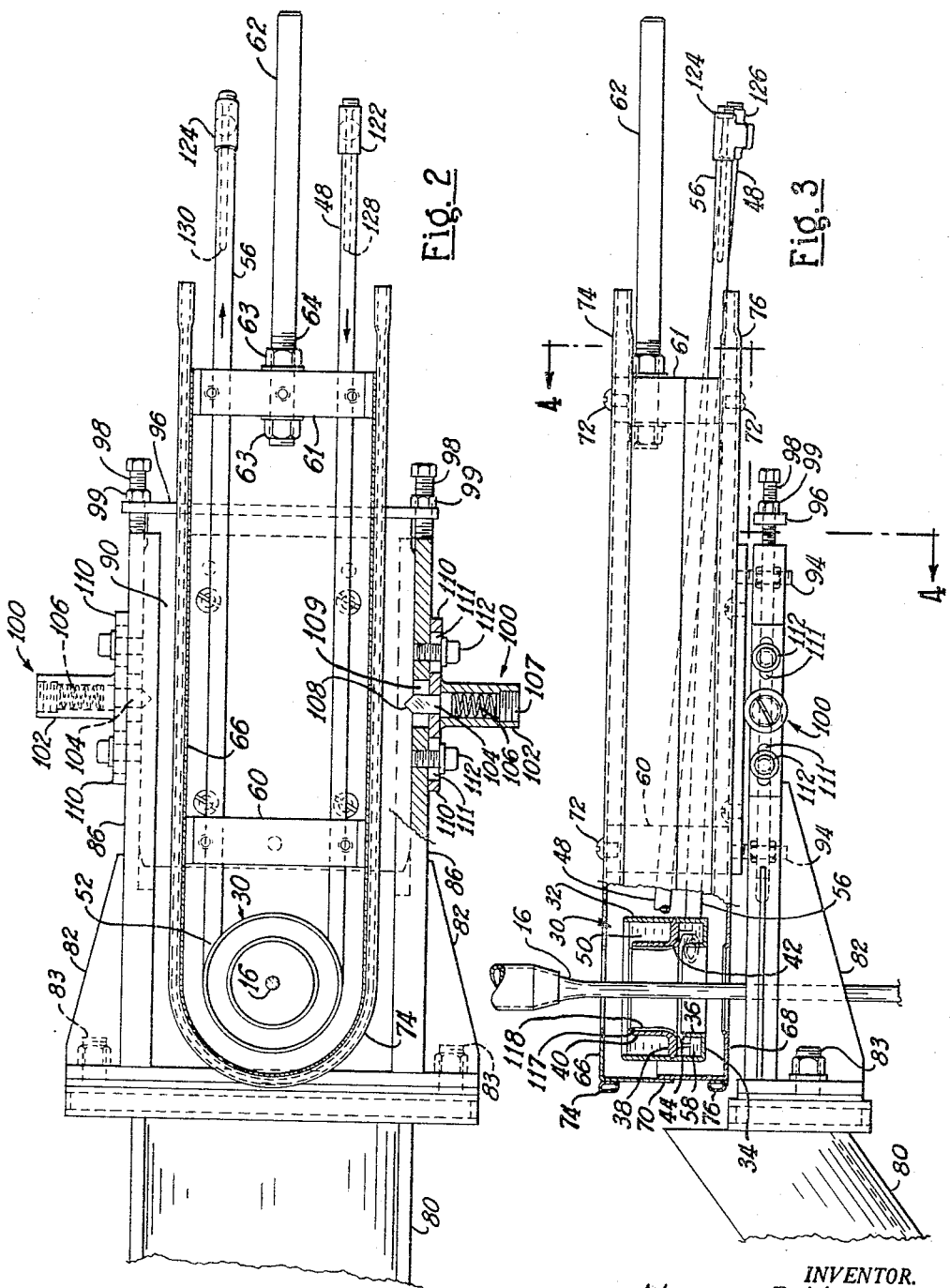

United States Patent Office 3,324,721
Patented June 13, 1967

3,324,721
METHOD FOR INDICATING MATERIAL STREAM CHARACTERISTICS BY CALORIMETRY
William P. Warthen, Spartanburg, S.C., assignor to Owens-Corning Fiberglas Corporation, a corporation of Delaware
Original application Feb. 1, 1962, Ser. No. 170,420, now Patent No. 3,236,099, dated Feb. 22, 1966. Divided and this application Sept. 28, 1965, Ser. No. 490,845
7 Claims. (Cl. 73—204)

This is a division of my copending application Ser. No. 170,420 now Pat. 3,236,099.

This invention relates to method of and apparatus for indicating and controlling the flow characteristics or quantity of heat-softened or molten material of a stream flowing from a supply, the method and apparatus being particularly usable for indicating and controlling the flow rate or quantity of a stream of heat-softened material such as glass, slag, fusible rock, molten metals or other heat-softenable materials through the utilization of calorimetry or determinations of differentials in the amount of heat absorbed from a flowing stream of the material.

Various methods of processing heat-softenable or molten materials include the steps of flowing a stream of the molten material wherein it is imperative that the flow rate of the material or size of the stream be maintained equal to the disposition of the material in the processing operations.

In the formation of fibers or filaments of molten glass by rotary processes, a stream of glass is delivered into a rotating hollow rotor and the material within the rotor projected by centrifugal force through orifices or outlets in the periphery of the rotor to form filaments or fibers. In such processes it is necessary for continuous and efficient operation that the input of molten glass of the stream be equal to the output of the glass from the rotor in the form of fibers or filaments. If the stream characteristics vary and a greater amount of glass is delivered into the rotor than the amount projected through the orifices, the rotor fills with glass and interrupts the operation. If an insufficient flow rate or amount of glass is delivered into the rotor, the production of filaments or fibers through the orifices is reduced and are of nonuniform size.

Endeavors have been made to indicate variations in the flow characteristics of a stream and glass throughout but such methods have disadvantages rendering them ineffective and inefficient for accurately indicating throughput or flow charcateristics of a stream of substantial size. In rotary fiber-forming processes, especially where the fibers are formed from molten glass, minute variations in the continuous flow rate or amount of glass delivered into the rotor, if not instantly corrected, result in an excess or insufficiency of glass in the rotor in a comparatively short period of time rendering the operation unstable.

This invention embraces a method of continuously indicating the flow rate or quantity of heat-softened material of a stream through the utilization of a film of liquid continuously moving in heat transferring relation with the stream whereby differential temperatures of the liquid of the film influence a sensing means to provide a continuous indication of the flow characteristics of the stream.

The invention embraces a method or system for indicating variations in the flow characteristics of a stream of heat-softened material and throughput or quantity thereof from a feeder utilizing a moving film of liquid directly exposed to the stream in heat transferring relation therewith, the heat absorbed by the liquid establishing temperature differentials which, summated with variations in temperature of the material of the supply, are translated by thermo-electric means to an indicating instrumentality.

Another object of the invention resides in a method or system of continuously indicating the characteristics of a stream of heat-softened material and variations in throughput to enable the instant correction of operating conditions to maintain constant the size or flow rate of the stream.

Another object of the invention is the provision of an apparatus for use with a stream of heat-softened material including an arrangement for continuously flowing a film of liquid in a region surrounding the stream to absorb heat therefrom setting up temperature differentials in the liquid which are utilized for indicating variations in the size of the stream, the apparatus including a circulating cooling fluid for maintaining components of the apparatus at safe operating temperatures.

Another object of the invention is the provision of an arrangement wherein a continuously moving film of liquid surrounds and is directly exposed to a stream of heat-softened material, the heat absorbed by the film providing a sensing media for indicating characteristics of the stream and wherein the position of the stream within the liquid media is relatively immaterial in attaining an accurate indication.

Another object of the invention is the provision of calorimeter chambers surrounding a stream of heat-softened material wherein a liquid flows from one chamber to the other in a region directly exposed to the stream of material and is in the form of a thin film which readily absorbs heat from the stream of material, the temperature differential in the liquid being employed upon temperature responsive means connected with an indicator for continuously indicating the flow characteristics of the stream.

Another object of the invention is the provision of a calorimeter utilizing a thin film of liquid providing a continuously moving heat absorbing media unaffected by volatiles or condensation so that the coefficient of absorption of the media is maintained constant.

Another object of the invention is the provision of a calorimeter for indicating variations in the flow characteristics in a stream of heat-softened material wherein a moving film of liquid is continuously exposed to the stream and other components of the calorimeter fashioned or shielded to reduce to a minimum the absorption of heat by such components from the glass stream.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-diagrammatic view illustrating an arrangement for feeding a stream of heat-softened material into a hollow rotor of a fiber-forming apparatus associated with a form of calorimeter construction of the invention;

FIGURE 2 is a top plan view illustrating a form of calorimeter construction for carrying out the method of the invention, certain parts being shown in section;

FIGURE 3 is a safe elevational view of the arrangement illustrated in FIGURE 2, certain portions being illustrated in section;

Figure 4:
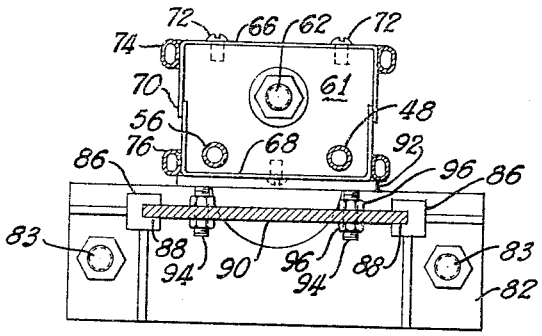
FIGURE 4 is a transverse sectional view taken substantially on the line 4—4 of FIGURE 3.

While the method and appartus of the invention have particular utility in providing a continuous and accurate indication of the characteristics or quantity of a stream of heat-softened mineral material, such as glass, it is to be understood that the method and apparatus may be employed for indicating the flow rate or quantity of streams of other heat-softened materials.

The invention has particular utility in determining the flow rate or quantity of a stream of glass of substantial size and the embodiments of the drawings are illustrated in association with a single glass stream but the calorimeter construction may be employed with a plurality of streams. Referring initially to FIGURE 1, heat-softenable material, such as glass, in a heat-softened flowable condition is supplied from a feeder 10 which may be a part of a forehearth attached to a melting furnace (not shown) or the same may be an individually heated receptacle containing glass maintained in a flowable or molten condition.

The feeder 10 is formed with a depending projection 12 formed with a passage or orifice 14 through which a stream 16 of heat-softened mineral material or glass is flowed and is delivered into a means for further processing the material for attenuation to fibers or filaments or the glass of the stream may be utilized in other processes. As shown in FIGURE 1, the stream of glass 16 is delivered into a hollow rotor 18 through a hollow hub portion 20 formed on the rotor. The rotor is adapted to be rotated at comparatively high speed by a motor or other means (not shown).

The stream of glass is delivered through the hollow hub or shaft portion 20 into a distributor 22 of cup shape positioned within the rotor and which is also rotatable. The peripheral wall of the distributor is formed with a plurality of openings or orifices 24 through which the molten glass is projected by centrifugal forces into engagement with the inner surface of the peripheral wall 26 of the rotor forming a supply film of glass on the interior of the rotor.

The peripheral wall 26 of the rotor 18 is fashioned with a large number of small openings or orifices 28 through which the heat-softened glass is delivered under the influence of centrifugal forces. The glass projected through the orifices 28 may be in the form of primary filaments or small streams which are engaged by an annularly shaped high velocity blast (not shown) for attenuating the streams to fibers or the streams emanating from the orifices 28 may be attenuated to fine continuous filaments under the influence of the rotation of the rotor and centrifugal forces.

In processing the material of the stream in the manner above mentioned, the flow rate or quantity of glass is critical especially in the formation of fibers or filaments wherein a constant amount of glass is necessary to continuously replenish the supply in the rotor in order to form uniform streams and fibers of uniform size. The viscosity and hence flow rate of the glass of the stream is extremely critical to small temperature variations.

The present invention provides a method and means for continuously indicating the flow rate or characteristics of the stream so that any deviation in flow rate or quantity is indicated and operating conditions corrected to re-establish the desired flow rate.

FIGURES 1 through 4 illustrate an embodiment wherein a continuously moving or flowing film of heat-absorbing liquid is maintained adjacent the stream and directly exposed to the material of the stream in heat-transferring relation thereto. The liquid providing the film is flowed at a constant rate and quantity enabling the differences in temperature of the liquid at spaced regions to be utilized as a media or determinant for indicating variations in the flow rate or quantity of the material of the stream.

Disposed beneath the feeder or forehearth 10 and adjacent and surrounding the stream 16 is a receptacle 30 preferably of annular shape having an outer wall 32, an annularly shaped bottom wall 34 and an upwardly extending circular flange 36 surrounding the stream, the circular flange 36 being preferably concentric with the stream. Disposed above the flange 36 is an annularly shaped partition 38 which forms a supplemental bottom in the receptacle 30, a tubular portion or circular or inner wall 40 extending upwardly from the annular partition 38, as shown in FIGURE 3.

The inner surfaces of the portions 36 and 40 are substantially of the same diameter and are arranged in vertically spaced relation as illustrated. The juncture of the partition 38 with the tubular portion or inner wall 40 is curved as shown at 42 and the upper circular edge of the flange or tubular portion 36 is preferably chamfered or beveled as shown at 44.

Welded, brazed or otherwise secured to the chamber wall 32 is an inlet tube, pipe or duct 48 which is in communication at 52 with the annularly-shaped chamber 50 provided by the walls 32 and 40 and the supplemental bottom 38 as shown in FIGURE 3.

Welded, brazed or secured to the chamber wall 32 is an outlet tube 56, the outlet tube being in communication with the second annular chamber 58 defined by the walls 32, 36 and the annular bottom portion 34. The tubes 48 and 56 are held in transversely spaced relation by means of spacers or frame members 60 and 61. A rod or handle member 62 is secured to the member 61 by threaded nuts 63 cooperating with a threaded portion 64 of the rod 62 extending through an opening in the member 61 for ease in withdrawing the calorimeter unit from operative position or replacing the same.

The rod 62 for moving the calorimeter unit may be connected with a fluid operated servo-motor such as a compressed air actuator for moving the calorimeter unit. A metal housing or enclosure preferably surrounds the chamber construction 30, the inlet and outlet tubes 48 and 56 and the spacer members 60 and 61.

As shown in FIGURES 3 and 4, two mating housing sections 66 and 68 are arranged in overlapping relation as shown at 70 and extend lengthwise of the tubes 48 and 60, the sections being secured to the spacer members 60 and 61 by means of screws 72. Cooling jackets in the form of tubular ducts or members 74 and 76 are coextensively arranged with the housing or casing sections 66 and 68 for maintaining the housing at reduced temperature.

The calorimeter arrangement is removably mounted on a support so that the same may be withdrawn from association or operative position with the stream 16 when desired. The supporting structure is inclusive of a support member 80 to which is secured a mounting bracket 82 held in place by means of bolts 83. The bracket 82 is formed with spaced parallel members or bars 86 provided with longitudinally extending notches or recesses 88 to slidably accommodate a plate or carrier 90. Secured to the bottom wall of the casing section 68 is a plate 92.

Threaded studs 94 are carried by the plate 92 and extend downwardly through openings formed in the plate 90, the plate 92 and the housing assembly being adjustable in a vertical direction by manipulation of threaded nuts cooperating with the studs 94, this construction being particularly illustrated in FIGURE 4. Welded to the forward region of the plate 90 is a transversely extending bar or member 96, the ends being provided with threaded openings accommodating threaded members or bolts 98 which are adapted to be locked in adjusted position by threaded nuts 99.

As shown in FIGURE 2, the threaded members 98 engage or abut the forward ends of the bar portions 86 to limit the movement of plate 90 and the components carried thereby when the calorimeter unit is moved into operative position with the stream. Means is provided for normally and resiliently maintaining the plate 90 in adjusted position of use supported by the bars 86. Secured to each bar 86 is a fitting 100 having a projection 102 bored to accommodate a plunger 104 and an expansive coil spring 106, the bore being closed by a threaded plug 107. An end of each plunger 104 is preferably of V-shape adapted to engage in a V-shape recess or notch 108 fashioned in each lateral edge of the plate 90.

Each fitting 100 is provided with a flange portion 110 fashioned with slots 111 to accommodate securing bolts 112 threaded into openings in the bar 86. Each projection or plunger 108 extends tthrough an elongated slot 109 formed in each bar 86. Through the provision of the elongated slots 109 and 111, the fittings 100 may be adjusted lengthwise of the bars 86 to change the relative position of the calorimeter unit mounted by the plate 90. The plate 90 and the components carried thereby may be slidably removed from the ways provided by the bars 86 for purposes of repair or replacement.

When the plate 90 is reassembled in the ways, it is slidably moved until the plungers 104 engage in the recesses 108, the threaded members 98 limiting the movement of the plate toward the stream 16.

If it is desired to change the position of plate 90 relative to the mounting bracket 82, the fittings 100 and the limit screws 98 are readjusted. As the plate 90 supports the chamber 30, the housing sections 66 and 68 and the tubes 48, 56, 74 and 76, the entire heat transfer assembly or calorimeter may be removed by withdrawing plate 90 from engagement with the bars 86.

The arrangement of the invention is inclusive of means associated with the tubes 48 and 56 conveying liquid into the chamber 50 and away from the chamber 58 for determining minute variations in the amount of heat absorbed by or transferred to the liquid from the glass stream 16 whereby a continuous indication is provided of the flow rate or quantity of glass of the stream. The method involves circulating a thin film of liquid, such as water, through a region adjacent the stream and in heat transferring or heat absorbing relation thereto in a manner whereby the film of liquid is directly exposed to the stream.

In accomplishing this function, liquid such as water is flowed into the upper annular chamber 50 through the inlet pipe 48 filling the chamber 50. As the delivery of water into the chamber 50 is continuous and at a constant rate, the water flows over the upper rim or edge 117 of the chamber wall 40 thence downwardly along the inner surface of the wall 40 in a thin film 118 which is directly exposed to the stream of glass and therefore absorbs heat directly from the glass. The film of water flows downwardly into the collecting chamber 58 thence through the outlet pipe 56.

Thus the circular inner wall 40 defining the chamber 50 provides a dam or weir over which the liquid flows as a cylindrical thin film 118 into the chamber 58. Through this method, heat from the glass is directly absorbed by the water or other liquid without the use of a metal walled tube or the like. The film of water is not affected by volatiles which may be given off by the hot glass and its heat absorption factor is therefore constant.

In prior arrangements where fluid is circulated through a metal tube, the volatiles from the glass condense on the tube walls and modify the rate or coefficient of absorption of the tube wall. Through the use of a film of water as a heat transfer medium, there is no variation in heat absorption by the film of water or other liquid because the film is continuously moving and is replaced continuously by fresh water. The liquid film forms a heat absorbing or heat transferring media which is extremely reliable in indicating temperature variations because it is not affected by volatiles or other foreign matter ambient the glass stream because of the continuity of fresh liquid continuously flowing adjacent the stream.

The inlet tube 48 is provided with a T-shaped fitting 122 and the outlet pipe 56 provided with a T-shaped fitting 124. The side branch of the inlet fitting 122 is connected with a valve 126 for regulating or controlling the flow rate of water through the heat absorbing or heat transfer unit. The fittings 122 and 124 are equipped with temperature sensitive means which are responsive to minute variations in temperature of the water.

It has been found that thermistors provide an efficient media responsive to temperature, which when connected with a suitable indicating circuit, are effective to indicate temperature variations by reason of variations in heat absorbed from the glass and hence variations in the flow rate or quantity of glass of the stream. The inlet fitting 122 is provided with a thermistor 128 and the outlet fitting 124 provided with a second thermistor 130. The feeder 12 is preferably provided with a thermocouple 133 arranged to be influenced by variations in the temperature of glass in the feeder.

The circuit for directly indicating variations in heat absorbed or transferred from the glass to the film of circulating water or other heat absorbing liquid summated with temperature variations of the glass supply is illustrated in FIGURE 1. A balanced resistance system similar to a Wheatstone bridge 132 is intercalated in circuit with the thermistors 128 and 130. A galvanometer or electrically influenced indicating means 134 is associated with the Wheatstone bridge arrangement 132 for indicating variations in temperature of the glass in the feeder and any deviation or differential in the amount of heat absorbed into the moving film of water or other liquid between the thermistors 128 and 130.

As illustrated in FIGURE 1, the thermistor 128 constitutes one leg 136 of the resistance system and the thermistor 130 constitutes the other leg 138 of the resistance system. The resistance of the thermistor 128 is normally balanced by a resistance 140 which is preferably of a variable type for balancing the system.

The thermocouple 133 is in series with a resistance 142 in the other leg of the resistance system. The resistance of the thermistor 130 is balanced by a resistance 142 which may be of the fixed character and that of the thermocouple 133. It is to be understood that either of the resistances 140 or 142 may be of the variable type in order to balance the system.

A source 144 of direct current is connected across the resistance system or Wheatstone bridge arrangement in the manner illustrated in FIGURE 1. Thermistors are preferably employed as thermo-responsive components or instrumentalities because of their sensitivity to minute temperature variations and therefore provide an accurate indication of variations in the amount of heat absorbed in the film of water during its flow in the heat transfer region with respect to the stream of glass.

The use of the thermocouple 133 in the orificed tip 12 or the bushing 10 to monitor changes in glass temperature and effect an indication thereof in the balancing bridge circuit, requires inclusion in the thermocouple circuit of means to render the generated potentials in the thermocouple leg of the Wheatstone bridge or balanced resistance system compatible with the characteristics of the thermistor resistance changes under the influence of temperature variations in the water. In order that the circuits be compatible so as to compensate for variations in glass temperature, and correspondingly, the viscosity changes in the glass, a voltage drop is provided in the thermocouple circuit which balances out the generated voltage of the thermocouple at a predetermined glass temperature so that this temperature provides a zero reference medium about which the thermocouple voltage variation functions through the resistance 142 to render the thermocouple leg of the Wheatstone bridge or balanced resistance system compatible with the circuit involving the thermistors sensing variations in water temperature. This is accomplished by providing a relatively low resistance 150 in series with the thermocouple circuit, the resistance 150, being bridged with a potential such as a battery 152, or other suitable source of direct current potential, which is in series with an adjustable resistance 154.

By provision of the voltage balancing resistor 150, the thermocouple signal is either additive or subtractive in the thermocouple leg of the balancing bridge or Wheatstone bridge depending upon whether a rise or drop in temperature occurs at the feeder tip 12.

In the method of operation and use of the arrangement shown in FIGURES 1 through 4, a constant flow of liquid, such as water, is established through the tube 48 and the rate of flow of the liquid controlled or metered by the valve means 126. A constant flow of water is essential in order that the film of water move or flow along but spaced from the stream at a constant rate to provide for continuous heat absorption into the water of the film. Under normal operating conditions wherein the heat absorbed into the water is constant, the difference in temperature of the water at the regions of the thermistors is constant and the resistance in the circuit balanced with the galvanometer needle 135 in a relatively fixed position.

Such position is maintained so long as there is no deviation from the normal differential in temperature between the thermistors 128 and 130 and no deviation in the temperature of glass in the feeder.

The temperature of the water or other liquid entering the tube 48 through the fitting 122 is immaterial as the differential in the temperature of the water affecting the thermistors 128 and 130 is a motivating factor setting up an unbalance condition in the indicating system indicating variations in the flow characteristics of the stream of glass.

Change or variation in the amount of absorbed heat sets up a corresponding change in the normal heat differential between the thermistors 128 and 130 causing an unbalanced condition in the resistance system or Wheatstone bridge 132, resulting in a movement of the galvanometer indicator 135 from its normal or balanced position. The galvanometer chart or dial 137 may be calibrated to indicate increase or decrease in the flow rate of the material of the stream or the size of the stream or any suitable calibration to indicate the throughput of glass.

If the temperature of the glass remains constant and throughput varies, such indication will be provided by the indicator 135 by reason of the variation in temperature differentials in the water transmitted to the indicator by the thermistors.

If, however, variation in temperature of the glass occurs in the stream 16, this change is sensed by the thermocouple which introduces a compensating signal to the balancing bridge or Wheatstone bridge so that the thermistor circuits will still provide an accurate indication of throughput, regardless of the tendency of such variation in temperature to otherwise provide indication of change in throughput. Thus, with a rise in temperature of the glass, the thermistor circuits indicate greater throughput because of the resulting greater difference in temperature between the inlet and outlet water at the unit 30, regardless of the fact that the throughput does not vary. In providing the thermocouple at the feeder tip 12, such indication is compensated by changing the base of measurement in the balancing bridge so that difference in temperatures of inlet and outlet water for the unit 30 will indicate throughput accurately regardless of the variations in the temperature at the feeder tip 12.

This arrangement provides a continuously operative indication for detecting or sensing minute variations in the operating conditions which would affect the size of the stream or its flow characteristics. The position of the galvanometer needle 135 provides constant visual indication of a malfunctioning of operating conditions affecting the throughput of glass so that correction may be made to restore proper stream flow. The electric current influencing the galvanometer in the resistancee system may be amplified and connected to a recording apparatus of conventional character in the event a permanent record of the operating conditions is desired.

The cooling tubes 74 and 76 are connected with a source of cooling water or other fluid which is circulated through the tubes for cooling the sections 66 and 68 of the housing enclosing the chamber 30 and particularly maintains at a reduced temperature the shield portions defining the openings in the housing sections accommodating the glass stream. It should be noted that the outlet tube 56 connected with the annular chamber 58 is inclined downwardly in order to facilitate gravity flow of water away from the calorimeter chamber 58.

Figure 5:
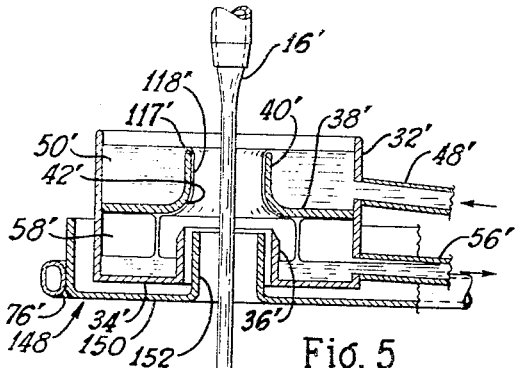
FIGURE 5 is a vertical sectional view illustrating a modified form of the calorimeter construction of the invention.

FIGURE 5 illustrates a modified form of calorimeter unit for use with a glass stream 16'. In this form the outer wall 32', the inner wall 40' and the horizontal bottom wall 38' define the upper annular chamber 50'. Water or other liquid is conveyed into the chamber 50' through the inlet pipe 48' at a controlled rate. The water flows over the upper edge or rim 117' of the wall 40' forming a thin film of water 118' which flows downwardly around the curved region 42' into the annular chamber 58'. The chamber 58' is defined by the outer wall 32', an inner wall 36' and an annular bottom or floor 34'.

The film of water flows into the annular chamber 58' and through the outlet tube 56' in the same manner as hereinbefore described in connection with the form shown in FIGURES 1, 2 and 3. In this form a lower housing section 148, generally of the shape of the housing 68 shown in FIGURE 3, is fashioned with a bottom wall 150 and an upwardly extending circular flange or wall 152 spaced from but in close proximity to the circular wall 36' which defines the inner wall of the chamber 58', the circular wall 152 being preferably concentric with the wall 36'.

A tube 76' is in heat transferring relation with the housing section 148 and is arranged to accommodate circulating cooling water or other temperature reducing fluid to maintain the housing section 148 at reduced temperature and particularly to radiate heat away from the circular wall 152. In this form the circular wall 152 provides a water cooled shield to minimize the transfer of heat from the glass stream 16' to the wall 36' of the lower chamber 58'. An upper housing section (not shown) similar to the housing section 66 is employed with the lower housing section 148.

Figure 6:
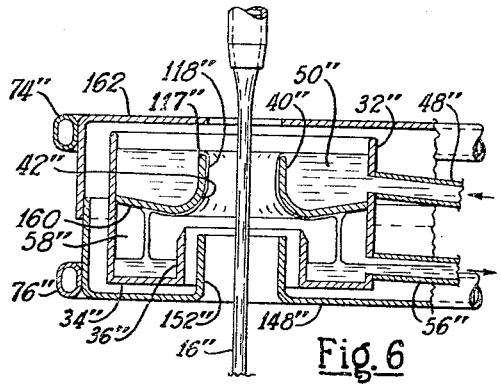
FIGURE 6 is a sectional view illustrating another form of calorimeter construction.

The arrangement shown in FIGURE 6 is a modification of the arrangement shown in FIGURE 5. In this form, the upper chamber 50'' is defined by an outer wall 32'', an inner wall 40'' and a bottom wall or floor 160. In the arrangement shown in FIGURE 6, the annularly shaped bottom wall or plate 160 is inclined upwardly and outwardly from the curved region 42'' and joins the inner wall 40'' with the outer chamber wall 32''. The inclination or angularity of the bottom plate 160 with respect to a horizontal plane may be a maximum of about 10°.

It is found that, up to this degree of angularity, the film of water 118'' flowing along the wall 40'' will adhere to and migrate for a substantial distance upwardly along the upwardly inclined bottom plate 160 until the accumulated volume of water adhering to the lower surface of the inclined floor 160 overcomes the tendency of the water to adhere to the bottom wall. At this region the water falls into the chamber 58'' defined by an upwardly extending circular wall 36'' and a bottom wall or floor 34''.

The housing section 148'' is fashioned with the upwardly extending circular wall or flange 152'' which acts as an effective heat transfer shield between the stream 16'' and the wall 36'' of the lower chamber 58''. In this form the lower chamber is effectively shielded from the glass stream and the film of water flowing along the inner surface of the chamber wall 40″ is exposed directly to the glass stream. The housing section 148″ is cooled by circulating cooling water flowing through a tube 76″.

The upper housing section 162 is cooled by circulating water or fluid conveyed through the cooling tube 74″. The water or other liquid for absorbing heat from the stream is conveyed at a controlled rate through the inlet tube 48″ into the chamber 50″ and the water in the chamber 58″ conveyed therefrom by the outlet tube 56″.

Figure 7:
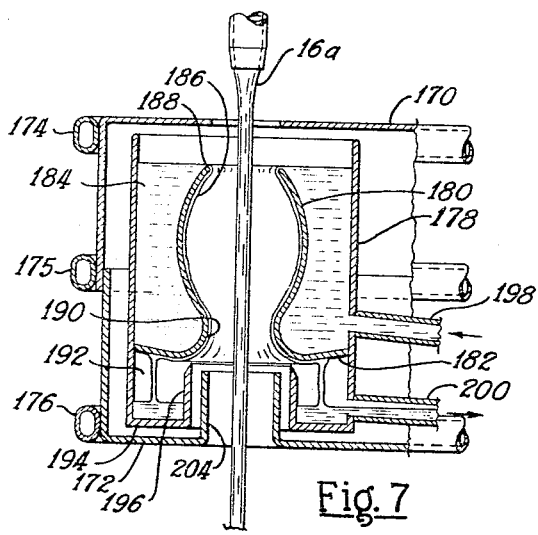
FIGURE 7 is a view illustrating another modification of calorimeter construction for carrying out the method of the invention.

FIGURE 7 is illustrative of another form of calorimeter unit where it is desired to increase the heat absorptive area of the film of water exposed to the glass stream. In this form, housing sections 170 and 172, generally of the shape of the sections 66 and 68, enclose the calorimeter chambers. The housing sections are cooled by circulating water or other cooling fluid circulated through tubes 174, 175 and 176 to maintain the housing sections at a reduced temperature.

The calorimeter unit includes an outer chamber wall 178, an inner chamber wall 180 which are of circular shape and a bottom wall 182 inclined upwardly as illustrated in FIGURE 7.

The inner wall 180 defining the upper chamber 184 is of hollow oval cross-section as illustrated providing for a substantially elongated generally vertical flow path for the film of water 186 flowing over the upper circular edge 188 of the wall 180. The lower region of the wall 180 is joined with the upwardly inclined wall 182 by the curved section 190 which functions in the same manner as the curved section 42″ shown in FIGURE 6.

By configurating the wall 180 of generally ovoidal shape, a greater area of the film of water is directly exposed to the glass stream 16a for the absorption of heat from the stream. The film of water flowing downwardly along the surface of wall 180 and the curved transition section 190 and thence upwardly along the inclined or angular bottom plate 182 falls away from the latter plate into the chamber 192 defined by the outer chamber wall 178, a second annular bottom plate 194 and an upwardly extending circular wall 196.

The water or heat absorbing media for the calorimeter enters the chamber 184 through an inlet tube 198 at a controlled rate and the water from the collecting chamber 192 conveyed away from the latter chamber through an outlet tube 200. The inlet and outlet tubes of the forms shown in FIGURES 5, 6 and 7 are connected with thermistor constructions and an indicating circuit arrangement of the character shown in FIGURE 1. The lower housing section 172 is formed with an upwardly extending circular flange or baffle 204 which, being cooled by water circulating through pipe 176, effectively shields the chamber wall 196 of the lower chamber from the glass stream.

As the input of water or other liquid heat absorbing media is controlled, a uniform film of water 186 is established which flows at a constant rate for absorbing heat from the glass stream 16a, establishing the temperature differentials at the thermistors whereby any variation in the temperature differentials are indicated on the galvanometer 134 to inform the operator of variations in the throughput of glass of the stream.

While the arrangement of the invention has particular utility in determining or indicating variations in throughput of a stream of heat-softened mineral material delivered into a rotor as shown in FIGURE 1, it is to be understood that the calorimeter arrangement may be employed for determining flow characteristics or flow rates of streams of other materials. The components of the calorimeter unit and the enclosing jacket or housing are preferably fashioned of metal, such as stainless steel, which has a comparatively low coefficient of thermal conductivity.

In the several forms illustrated in the drawings, it is desirable for promoting accuracy of the indication of the absorbed heat that the metal components be shielded or spaced sufficiently from the glass stream so that the film of water directly exposed to the glass stream functions as the major heat absorption media.

It is apparent that, within the scope of the invention, modifications and different arrangements may be made other than as herein disclosed, and the present disclosure is illustrative merely, the invention comprehending all variations thereof.

I claim:

1. The method of indicating variations in the flow characteristics of heat-softened glass including flowing a stream of heat-softened glass from a supply, flowing a stream of heat-absorbing liquid exposed to the atmosphere adjacent to and out of contact with the stream of glass, continuously absorbing heat transferred by radiation from the stream of glass into the liquid stream, and indicating variations in heat absorbed by the liquid.

2. The method of indicating variations in the flow characteristics of heat-softened glass including flowing a stream of heat-softened glass from a supply, establishing a free flowing stream of heat absorbing liquid adjacent to and out of contact with the stream of glass, continuously transferring heat by radiation from the stream of glass into the heat absorbing liquid, and indicating variations in heat absorbed from the glass into the flowing liquid.

3. The method of indicating variations in the flow characteristics of heat-softened glass including flowing a stream of heat-softened material from a supply, directly exposing a free flowing film of heat-absorbing liquid to the stream of glass, continuously transferring heat by radiation from the stream of glass into the liquid of the film, directing the liquid providing the film into heat-transferring relation with spaced thermo-electric instrumentalities, and conducting electric energy from the thermo-electric instrumentalities to an indicator for indicating variations in heat absorbed by the liquid.

4. The method of indicating variations in the flow characteristics of heat-softened material including flowing a stream of heat-softened material from a supply, directly exposing a free flowing film of heat-absorbing liquid to the stream of material, continuously transferring heat by radiation from the stream of material into the liquid of the film, directing the liquid providing the film into heat-transferring relation with spaced thermo-responsive instrumentalities, and indicating variations in heat absorbed by the film by temperature differentials influencing the thermo-responsive instrumentalities.

5. The method of indicating variations in the flow characteristics of heat-softened glass including flowing a stream of heat-softened glass from a supply, exposing a free flowing film of heat absorbing liquid to the stream whereby the liquid continuously absorbs heat by radiation direct from the material of the stream, subjecting the liquid of the film before and after exposure to the stream of glass to thermo-responsive components, and indicating the differentials in heat transferred to the thermo-responsive components for indicating variations in flow characteristics of the stream.

6. The method of indicating variations in the flow characteristics of heat-softened glass including flowing a stream of substantially constant temperature heat-softened glass from a supply, circulating a liquid adjacent the stream of glass, exposing a free flowing stream of the circulating liquid to the glass of the stream and continuously transferring heat by radiation from the glass into the liquid, transferring heat from spaced regions of the circulating liquid to temperature sensitive instrumentalities, and detecting the differences in temperature of the liquid at the spaced regions to indicate variations in flow rate of the stream of glass.

7. The method of indicating variations in the characteristics of a stream of heat-softened glass including flowing a stream of heat-softened glass from a supply, exposing the material of the supply to a thermo-responsive component, exposing a free flowing stream of heat absorbing liquid to the stream of glass whereby the liquid continuously absorbs radiant heat from the glass, subjecting the heat absorbing liquid before and after exposure of the stream of glass to thermo-responsive components, and indicating variations in the thermo-responsive components under the influence of heat variations in the glass for indicating variations in the characteristics of the stream of glass.

References Cited

UNITED STATES PATENTS

| | | | |
|---|---|---|---|
| 1,156,503 | 10/1915 | Sheldon | 73—204 |
| 1,349,409 | 8/1920 | Crawford | 73—204 |
| 3,002,226 | 10/1961 | Warthen | 65—29 X |

LOUIS R. PRINCE, *Primary Examiner.*

S. C. SWISHER, *Assistant Examiner.*